Dec. 13, 1938.    L. N. SWISHER    2,140,037
SERVO MECHANISM
Original Filed Jan. 17, 1936    2 Sheets-Sheet 1
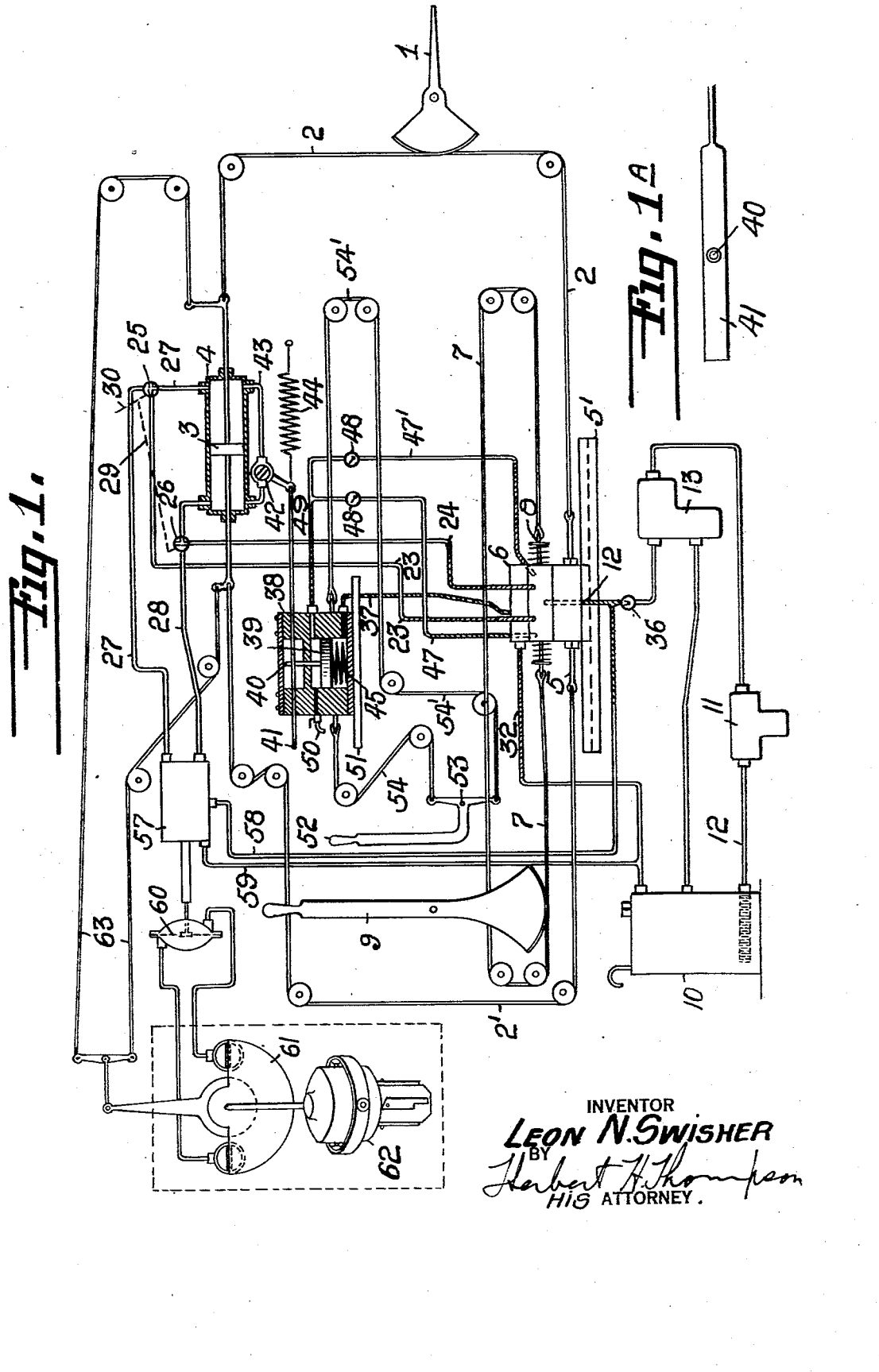
INVENTOR
*Leon N. Swisher*
BY *Herbert H. Thompson*
HIS ATTORNEY.

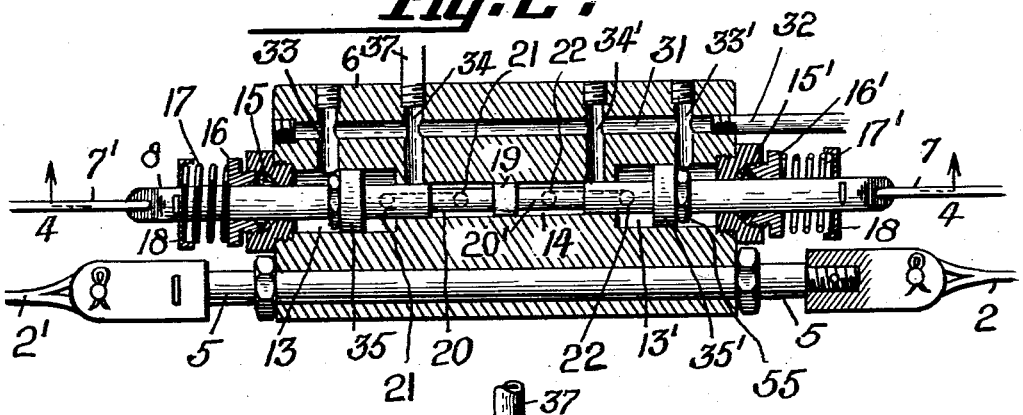
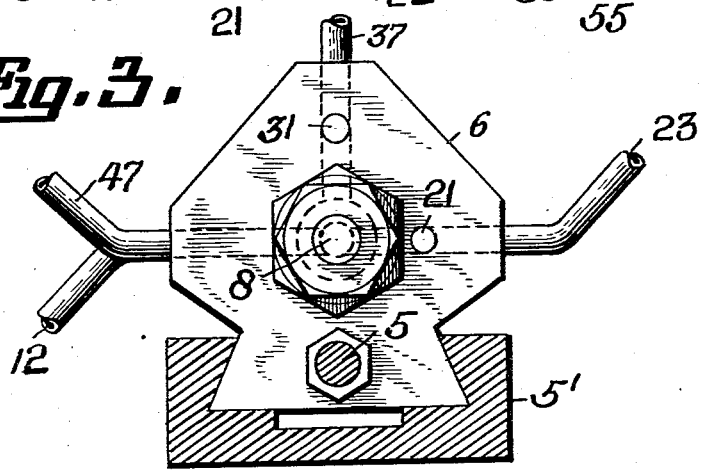
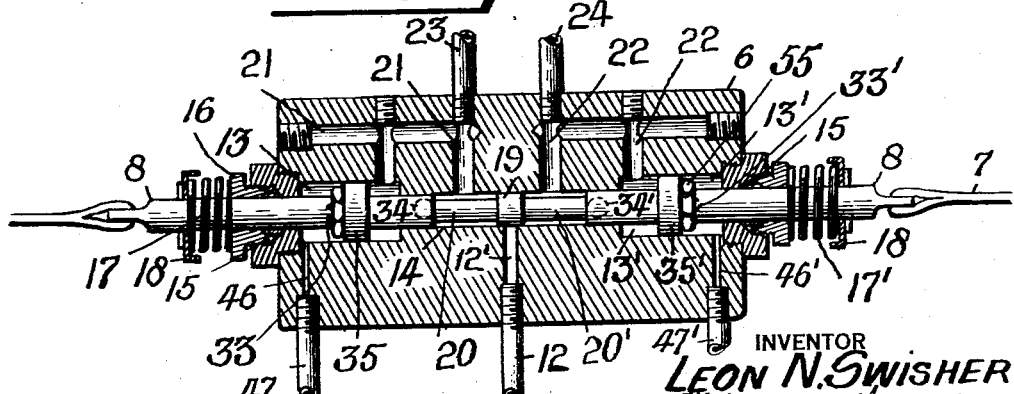

Patented Dec. 13, 1938

2,140,037

UNITED STATES PATENT OFFICE 2,140,037

SERVO MECHANISM

Leon N. Swisher, Brooklyn, N. Y., assignor to Sperry Gyroscope Company, Inc., Brooklyn, N. Y., a corporation of New York Application January 17, 1936, Serial No. 59,480
Renewed September 3, 1938

14 Claims. (Cl. 244—78)

This invention relates, generally, to servo mechanisms and the invention has reference, more particularly, to a novel servo mechanism especially suitable for operating the control surfaces of aircraft.

Manual operation of the control surfaces of aircraft, and especially the larger aircraft, becomes exceedingly tiresome, especially during long periods of flight, and consequently various servo mechanisms have been developed to relieve the pilot of the labor of manipulating the controls. The majority of these mechanisms heretofore developed have not proved entirely satisfactory in practice for various reasons, among which may be mentioned the tendency of such mechanisms to get out of order and the difficulty of shifting from power to manual control, especially when the servo mechanism becomes deranged, the tendency of such mechanisms to vibrate or operate irregularly and without a smooth flow of power, and a failure to keep the power exerted by these mechanisms within a reasonable range.

The principal object of the present invention is to provide a novel servo mechanism for operating the control surfaces of aircraft, the said mechanism being hydraulically operated and providing an exceedingly smooth control of such surfaces, the same being adapted to apply as much power as may be desired to suit the requirements of any particular installation, while at the same time enabling the operator to retain the "feel" of the controls, which is highly desirable.

Another object of the present invention lies in the provision of a novel servo mechanism of the above character that is of simple, rugged design, the same having a self contained follow-up mechanism and being operable to automatically shift the control from power to manual in the event that the servo mechanism should fail to perform for any reason, means being provided for varying the speed of operation of the servo mechanism and for locking the controls at will.

Still another object of the present invention is to provide a novel servo mechanism of the above character that is adapted, if desired, to be controlled automatically as by the control mechanism of an automatic pilot such as that disclosed in Patent No. 1,992,970 of March 5, 1935.

Other objects and advantages will become apparent from the specification, taken in connection with the accompanying drawings wherein one embodiment of the invention is illustrated.

In the drawings,

Fig. 1 is a schematic view of the novel servo mechanism of this invention employed for operating a control surface of an aircraft, the mechanism being illustrated as optionally controlled from an automatic pilot control mechanism.

Fig. 1A is a sectional plan view of a detail.

Fig. 2 is an enlarged vertical sectional view of the control valve of the mechanism.

Fig. 3 is an end view of the structure of Fig. 2 and also illustrates the guide therefor, and Fig. 4 is a sectional view taken along line 4—4 of Fig. 2, looking in the direction of the arrows.

Referring now to the said drawings, the reference numeral 1 designates a control surface of an aircraft, such as an aileron, elevator or rudder, the same being actuated by cable 2 connected to one side of a hydraulic piston 3 movable within a power cylinder 4 and to one end of a rod 5 serving as a follow-up connection to the servo mechanism control valve casing 6, that is movable in the direction of the length of rod 5 along a supporting guide 5'. The other side of hydraulic piston 3 is connected by cable 2' to the other end of rod 5. A manually operable control handle 9 is connected by a cable 7 to opposite ends of the normally centralized piston valve 8 movable within the control valve casing 6.

Pressure fluid, such as oil, is adapted to be supplied to the control valve casing 6 from a supply tank 10 through a supply pipe 12 having a pump 11 and a fluid pressure regulator 13 connected therein. A valve 36 is also included in pipe 12 for regulating the rate of flow of fluid therethrough. As especially shown in Figs. 2 to 4, the piston valve 8 extends through a longitudinal bore provided in the valve casing 6, the said bore having a central portion 14 providing a close sliding fit on the valve 8 and end portions 13 and 13' of larger diameter. Packing boxes 15 and 15', having glands 16 and 16', are threaded into the outer ends of the piston valve bore in surrounding relation to the piston valve 8.

Coil compression springs 17 and 17' surround piston valve 8 and abut glands 16 and 16' and washers 18 carried by valve 8 for centering this valve in casing 6. As thusly centered, the central portion 19 of piston valve 8 serves to close the passage 12' leading from the fluid supply pipe 12. The piston valve 8 is provided with reduced portions 20 and 20' adjoining the central portion 19, which reduced portions are opposite passages 21 and 22, respectively, communicating with pipes 23 and 24 that lead to two-way valves 25 and 26 that are connected in pipes 27 and 28. Valves 25 and 26 are interconnected by linkage 29, providing for simultaneous manual operation of these valves through actuation of a suitable handle 30. With valves 25 and 26 positioned as in Fig. 1, the pipes 23 and 24 communicate with the opposite ends of power cylinder 4. Passages 21 and 22 also communicate with the inner end portions of the enlarged parts 13 and 13' of the piston valve bore (see Fig. 4).

The valve casing 6 is provided with a fluid return passage 31 communicating with a return pipe 32 leading to the tank or reservoir 10. Passage 31 is provided with branch passages 33 and 33' leading to the enlarged portions 13 and 13' of the piston valve bore. Passage 31 is also provided with branch passages 34 and 34' leading to the end portions of the central part 14 of the piston valve bore. With the piston valve 8 centered as shown in the drawings, the same closes the inner ends of branch passages 34 and 34'. Piston valve 8 is provided with enlarged portions 35 and 35' for operating within the enlarged end parts 13 and 13' of the piston valve bore. With the piston valve centered, the portions 35 and 35' thereof are respectively positioned adjacent and inwardly of the branch passages 33 and 33'.

A pipe 37 communicates with the passage 34 and extends to a bypass control cylinder 38 for communicating with the lower part of the interior of this cylinder, i. e., pipe 37 connects to cylinder 38 at a point below the vertically movable piston 39 therein. Piston 39 carries an upwardly extending trip pin 40 that is adapted to project through a vertical aperture provided in a transverse rod 41 that extends through slide bearing apertures provided in the side walls of bypass control cylinder 38. A coil spring 45 below piston 39 urges this piston upwardly, thereby tending to retain trip pin 40 within the aperture of rod 41. The end of rod 41 is connected to the operating arm of a bypass valve 42 connected in a pipe 43 communicating with the ends of power cylinder 4. A spring 44 connected to the arm of valve 42 tends to move this valve to open position, in which position the piston 3 is bypassed by pipe 43 and valve 42. With trip pin 40 engaged in the aperture of rod 41 and with the bypass control cylinder 38 positioned as in Fig. 1, the valve 42 is held in its closed position against the action of spring 44.

Referring for the moment to Fig. 4, it will be noted that valve casing 6 is provided with passages 46 and 46' communicating with the enlarged parts or portions 13 and 13' of the piston valve bore and with pipes 47 and 47'. Passages 46 and 46' connect with bore portions 13 and 13' adjacent the packing boxes 15. Pipes 47 and 47' have check valves 48 therein and are connected to a common pipe 49 leading to bypass control cylinder 38 for communicating with the interior of the same at a point above the piston 39. A drain cock 50 also communicates with the interior of cylinder 38 at a point above piston 39. Bypass control cylinder 38 is movable in the direction of rod 41 within limits upon a supporting guide 51. A handle 52 pivoted at 53 serves to actuate cables 54 and 54' passing over suitable pulleys and connected to opposite sides of cylinder 38 for moving the latter.

In use, assuming the parts of the mechanism to be in their positions shown in the figures and that it is desired to turn the control surface 1 clockwise, for example, about its pivotal support, then the handle 9 is turned counterclockwise. This movement of handle 9 causes cable 7 to actuate the piston valve 8 toward the right from its central position, thereby causing the central portion 19 of this valve to uncover passage 12' and permit oil or other operating fluid to flow from pipe 12 around the reduced portion 20 of the piston valve, through passage 21, pipe 23, valve 25, pipe 27 to power cylinder 4, thereby actuating piston 3 toward the left and effecting through actuation of cable 2 the desired clockwise movement of the control surface 1.

The movement of piston 3 toward the left causes oil or other fluid to leave cylinder 4 through pipe 28, valve 26, pipe 24, passage 22 of valve casing 6, around the reduced portion 20' of piston valve 8, passage 34' which was uncovered by the initial movement of the piston valve, passage 31, and return pipe 32 back to the reservoir 10. Cable 2, in actuating the control surface 1, also serves to actuate the follow-up rod 5, thereby causing valve casing 6 to move to the right over guide 5' to follow up the movement of the piston valve 8 until the valve is again in its neutral or central position within the valve casing 6, at which time the flow of pressure fluid from pipe 12 is again shut off and the system comes to rest with the control surface 1 in the desired new position.

It will be noted that during the movement of the control surface 1, the magnitude of the fluid pressure existing within the power cylinder 4 and acting upon the piston 3 is dependent upon the resistance offered by the control surface 1, i. e., the larger the force required to move the control surface 1, the higher must the fluid pressure in cylinder 4 build up to operate the control surface. This fluid pressure exists throughout the pipe 23 and passage 21, so that substantially the same pressure is applied to the enlarged portion 35 of the piston valve 8 in a direction to oppose the direction of movement of this piston valve, whereby the pressure applied to handle 9 to effect movement of the control surface is necessarily substantially proportional to, though but a fraction of the resistance to movement offered by the control surface 1. Thus, the pilot is able to retain the "feel" of the controls, which is highly desirable even though he does not supply the force for operating the same.

The operation of the servo mechanism when turning the control surface 1 in a counterclockwise direction is similar to that obtaining when turning the control surface in a clockwise direction and hence would not appear to require additional explanation, except to state that handle 9 is turned clockwise and pressure fluid flows from pipe 12 through passage 22, pipe 24, valve 26 and pipe 28 to the power cylinder 4 for turning the control surface in the reverse direction.

In the event that the servo mechanism should fail to operate for any reason, due, for example, to the failure of pump 11, the system automatically becomes manually operable. Thus, assuming that it is desired to turn the control surface 1 clockwise and the handle 9 is turned counterclockwise as before, thereby moving the piston valve 8 to the right; since the supply of pressure fluid has failed, the connection of pipe 12 to pipe 23 produces no result. While the central portion 19 of valve 8 was moving to uncover passage 12', the enlarged portion 35' of the valve was moving to close the passage 33' leading to the fluid return pipe 31. Further movement of handle 9 and of valve 8 forces the trapped oil or other fluid in advance of enlarged portion 35' out through pipe 47' past check valve 48 and through pipe 49 into the bypass control cylinder 38, thereby depressing piston 39 (drain cock 50 being closed) and freeing trip pin 40 from the aperture in transverse rod 41, whereupon spring 44 acts to operate bypass valve 42 to open position and allows free movement of piston 3 within power cylinder 4. Continued movement of handle 9 thereafter serves to effect manual movement of the control surface 1 since the nut 55 adjacent the piston valve enlarged portion 35' abuts the packing box 15' and moves valve casing 6 bodily along guide 5', thereby actuating cable 2 and control surface 1.

By manually actuating the handle 52, the servo mechanism may be readily thrown into or out of operation as desired. Thus, assuming that as a result of the failure of the pump 11, the bypass control cylinder 38 has operated to open bypass valve 42 and that it is desired to again put the servo mechanism into operation, it is merely necessary to open drain cock 50 to release the fluid above piston 39, whereupon the latter will tend to rise under the action of spring 45. By moving handle 52 clockwise, the cylinder 38 is moved toward the right over guide 51, the upper end of trip pin 40 sliding along the under surface of rod 41 until it registers with the aperture in this rod, whereupon the pin 40 will enter the aperture under the action of spring 45. By then turning handle 52 counterclockwise the rod 41 may be actuated to again close valve 42, preparing the servo mechanism for operation. With trip pin 40 engaged in the aperture of rod 41, if it is desired to operate the control surface manually, it is merely necessary to turn handle 52 clockwise, thereby opening bypass valve 42 and permitting such manual operation.

In the event that it is desired to control the servo mechanism by use of the automatic pilot disclosed in the aforementioned Patent No. 1,992,970, it is merely necessary to connect the master hydraulic valve 57 of the automatic pilot to the fluid pressure supply and to the power cylinder 4, the valve 57 taking the place of the valve casing 6 and piston valve 8. Pipes 58 and 59 connect the valve 57 to supply pipe 12 and return pipe 32, respectively, while pipes 27 and 28 connect valve 57 to the ends of power cylinder 4. Valve 57 is controlled by a diaphragm 60 that in turn is controlled by variable air pressure determined by the position of a semicircular shutter 61 operated from the gyroscope 62, all as explained in the above identified patent assigned to the present assignee. When it is desired to use the automatic pilot to control the servo mechanism, it is merely necessary to actuate handle 30 to connect the valve 57 to cylinder 4, while at the same time disconnecting valve casing 6 from this cylinder. A follow-up connection 63 is provided between piston 3 and the automatic pilot. It will be apparent that the pipes connected to valve casing 6 and to bypass control cylinder 38 are flexible to enable bodily movement of these members.

The novel hydraulic servo mechanism of this invention is exceedingly smooth and quiet in operation, being free from vibration and noise. The speed of operation of the control surface may be raised at will by adjusting valve 36. With bypass valve 42 in closed position, the servo mechanism serves to lock the controls in any desired position. The novel servo mechanism of this invention is suitable for operating any size of control surface, regardless of the force required for such operation. Obviously, parts of the mechanism may be duplicated for operating a plurality of control surfaces.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a servo mechanism for operating the control surface of an aircraft, a power cylinder having a movable piston connected to the control surface for actuating the latter, a valve and valve casing, means for supplying fluid under pressure to said valve casing and for conducting pressure fluid therefrom to said power cylinder, manually operable means for moving said valve within its casing to control the flow of fluid to said power cylinder, and means for causing said pressure fluid to exert a back pressure on said valve so that the resistance offered to the manual movement of said valve within its casing is substantially proportional to the resistance to movement offered by the control surface.

2. In a servo mechanism for operating the control surface of an aircraft, a power cylinder having a movable piston connected to the control surface for actuating the latter, a valve and valve casing, means for supplying fluid under pressure to said valve casing and for conducting pressure fluid therefrom to said power cylinder, manually operable means for moving said valve within its casing to control the flow of fluid to said power cylinder, means for causing said pressure fluid to exert a back pressure on said valve so that the resistance offered to the manual movement of said valve within its casing is substantially proportional to the resistance to movement offered by the control surface, and a follow-up connection between the control surface and said valve casing, whereby the latter is caused to move bodily to follow up the movement of said valve therein.

3. In a servo mechanism for operating the control surface of an aircraft, a power cylinder having a movable piston connected to the control surface for actuating the latter, a valve and valve casing, means for supplying fluid under pressure to said valve casing and for conducting pressure fluid therefrom to said power cylinder, manually operable means for moving said valve within its casing to control the flow of fluid to said power cylinder, a bypass control cylinder connected to said valve casing and having a piston movable therein, a bypass for said power cylinder controlled from said bypass control cylinder piston, said valve being operable, upon failure of said fluid supply means, to force fluid into said bypass control cylinder and actuate its contained piston to cause the opening of said power cylinder bypass, thereby preparing said servo mechanism for manual operation of the control surface.

4. In a servo mechanism for operating the control surface of an aircraft, a power cylinder having a piston, a cable transmission connected to said piston and to said control surface for effecting movement of the latter, a valve casing included in the cable connection between said power cylinder piston and the control surface, whereby movement of said piston and the control surface results in corresponding movement of said valve casing, and a valve within said valve casing for controlling the flow of pressure fluid therethrough to said power cylinder.

5. In a servo mechanism for operating the control surface of an aircraft, a power cylinder having a piston, a cable transmission connected to said piston and to said control surface for effecting movement of the latter, a valve casing included in the cable connection between said power cylinder piston and the control surface, whereby movement of said piston and the control surface results in corresponding movement of said valve casing, a valve within said valve casing for controlling the flow of pressure fluid therethrough to said power cylinder, spring means for centering said valve in neutral position with respect to its casing, and a manual control member connected to said valve and operable against the tension of said spring means for moving said valve with respect to the casing, whereby pressure fluid is supplied to said power cylinder for moving the piston thereof and effecting movement of the control surface and follow-up movement of said valve casing.

6. In a servo mechanism for operating the control surface of an aircraft, a power cylinder having a piston, a cable transmission connected to said piston and to said control surface for effecting movement of the latter, a valve casing included in the cable connection between said power cylinder piston and the control surface, whereby movement of said piston and the control surface results in corresponding movement of said valve casing, a valve within said valve casing for controlling the flow of pressure fluid therethrough to said power cylinder, and means responsive to the relative movement of said valve and valve casing for bypassing said power cylinder.

7. In a servo mechanism for operating the control surface of an aircraft, a power cylinder having a piston connected for operating the control surface, a valve casing included in the connection between said power cylinder piston and the control surface, whereby movement of said piston and the control surface results in corresponding movement of said valve casing, a valve within said valve casing for controlling the flow of pressure fluid therethrough to said power cylinder, means responsive to the relative movement of said valve and valve casing for bypassing said power cylinder, and manually operable means for controlling the operation of said bypass means at will.

8. In a servo mechanism for operating a control surface of an aircraft, a servo motor having a cable driving connection with the control surface, a controller for controlling the operation of said servo motor, said controller having a part thereof connected in said cable driving connection as a part thereof, whereby movement of the control surface by said servo motor causes follow-up movement of said part of said controller, hand operated means, said controller having a second part thereof controlled from said hand operated means, stop means for limiting relative movement of said controller parts, said hand operating means acting through said stop means and said second controller part, in the event of the failure of said servo motor, to actuate said first controller part and the connected control surface directly, independently of said servo motor.

9. In a servo mechanism for aircraft, in combination with an aircraft control surface, of a power cylinder having an operating piston movable therein and transmission means connected to said piston and said control surface for effecting the actuation of the latter, a bodily movable valve casing having valve means therein connected for regulating the supply of pressure fluid to said power cylinder, means for supplying pressure fluid to said valve means, a portion of said transmission means providing a direct follow-up connection between said valve casing and said control surface.

10. In a servo mechanism for aircraft, in combination with an aircraft control surface of a power cylinder having an operating piston movable therein and transmission means connected to said piston and said control surface for effecting the actuation of the latter, valve means connected for regulating the supply of pressure fluid to said power cylinder, said valve means comprising a bodily movable valve casing and a valve therein, manually operable means for moving said valve within its casing to control the operation of said valve means, a portion of said transmission means providing a follow-up connection between said control surface and said valve casing for bodily moving the latter in response to movements of said control surface.

11. In a servo mechanism for aircraft, in combination with an aircraft control surface of a power cylinder having an operating piston movable therein and transmission means connected to said piston and said control surface for effecting the actuation of the latter, valve means connected for regulating the supply of pressure fluid to said power cylinder, said valve means comprising a valve casing and a valve therein, manually operable means for moving said valve within its casing to control the operation of said valve means, a portion of said transmission means poviding a follow-up connection between said control surface and said valve casing for bodily moving the latter in response to movements of said control surface, and means responsive to a predetermined maximum movement of said valve with respect to its casing for causing said manually operable means to operate said control surface directly.

12. In a fluid servo motor system for aircraft, a fluid pressure motor for turning the control surface, an operating valve therefor controlling the flow of fluid to and from said motor, including a valve rod moved by the governing impulse, a piston connected with said rod, and means for leading the pressure fluid to said piston to resist or oppose the governing impulse.

13. In a fluid servo motor system for aircraft, a fluid pressure motor for turning the control surface in either direction, an operating valve therefor movable in either direction from its normal shut-off position to cause pressure fluid flow in either direction to said motor, including a valve rod movable in either direction by the governing impulses, pistons connected with said rod, and means for supplying the pressure fluid to one or the other piston to resist or oppose the governing impulse.

14. In an airplane fluid operated servo system having an automatic pilot, the combination with the main piston and cylinder of the automatic pilot for turning a control surface in either direction, an operating valve therefor movable in either direction from its normal shut-off position to cause pressure fluid flow in either direction to said cylinder, including a member movable in either direction by primary impulses, and fluid pressure means connected therewith, for resisting or opposing the primary impulses responsive to the direction and pressure of fluid flow to and from said motor.

LEON N. SWISHER.